UNITED STATES PATENT OFFICE.

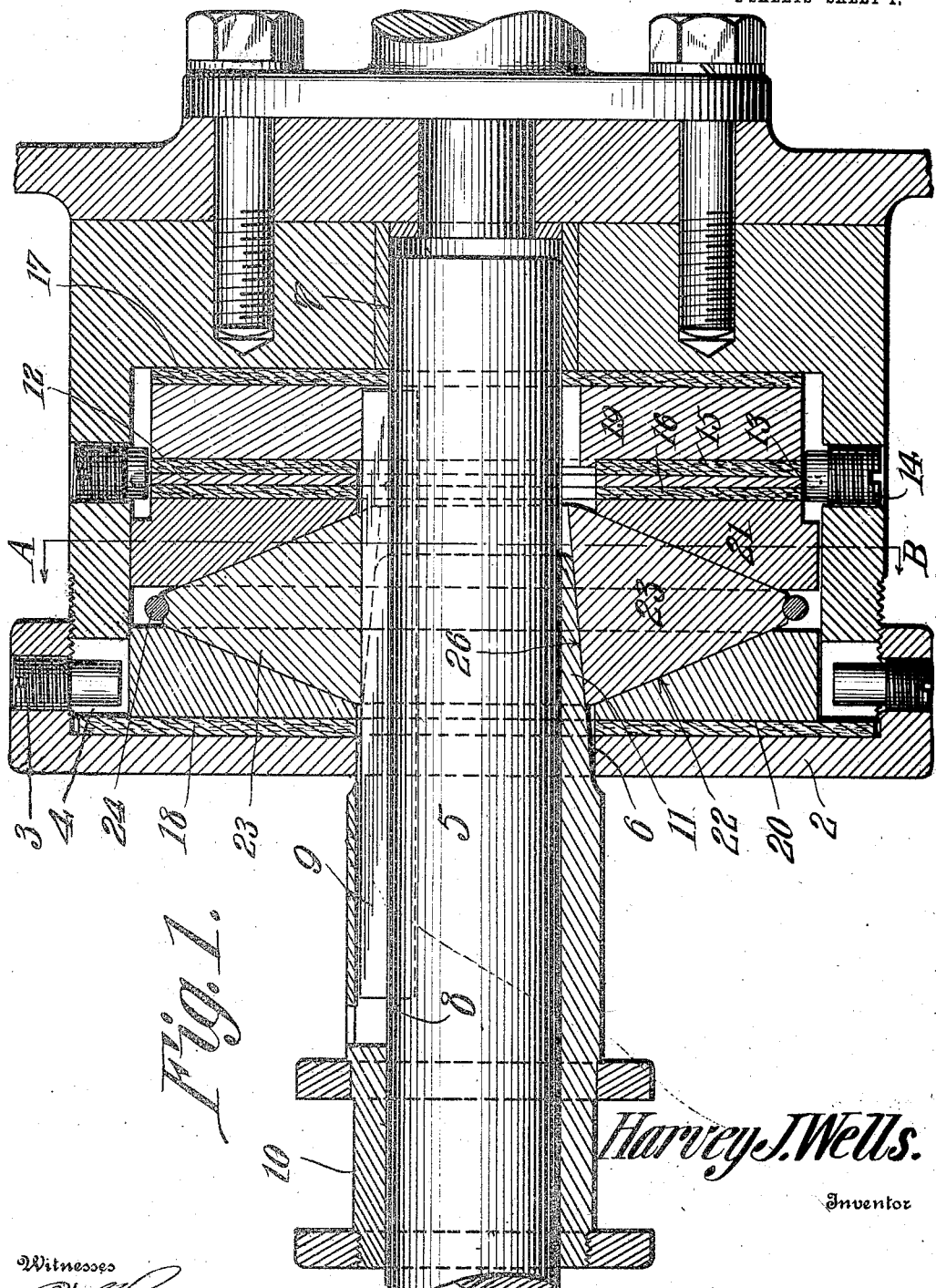

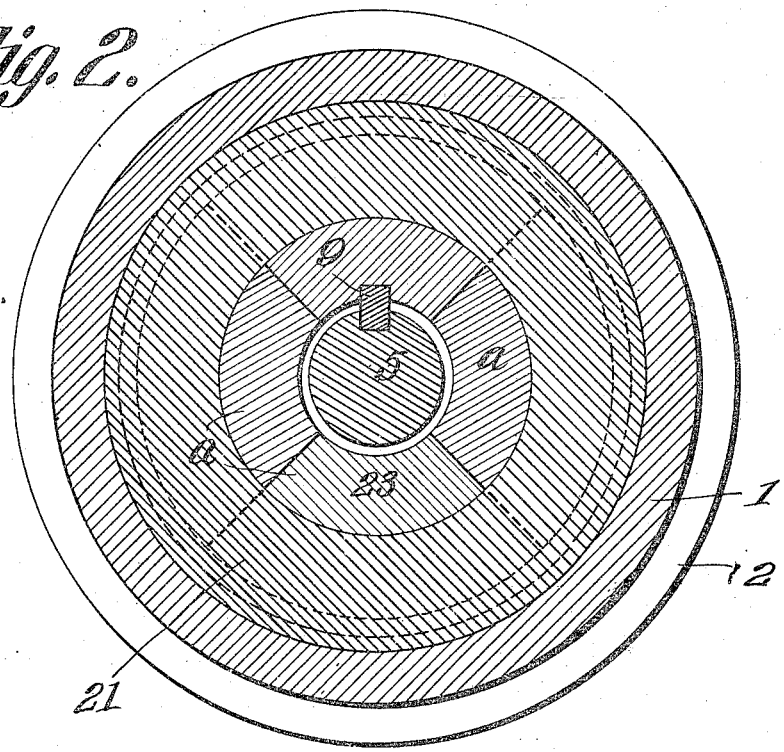
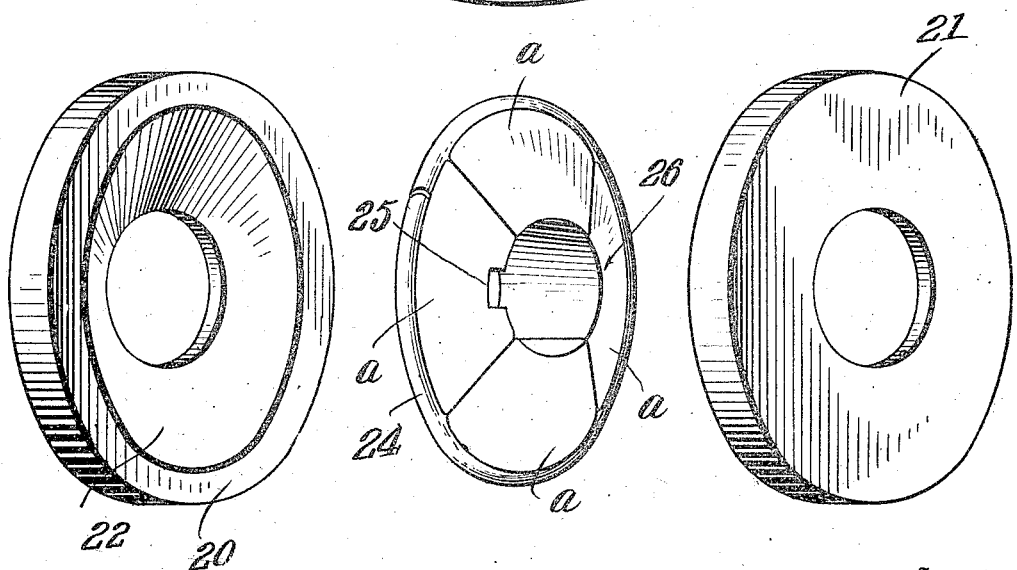

HARVEY J. WELLS, OF ELKHART, INDIANA.

FRICTION-CLUTCH.

967,094.   Specification of Letters Patent.   Patented Aug. 9, 1910.

Application filed February 1, 1910. Serial No. 541,329.

*To all whom it may concern:*

Be it known that I, HARVEY J. WELLS, a citizen of the United States, residing at Elkhart, in the county of Elkhart and State of Indiana, have invented a new and useful Friction-Clutch, of which the following is a specification.

This invention relates to friction clutches particularly designed for use in connection with the driving gear of automobiles and it is more especially designed as an improvement upon the structure disclosed in Patent No. 837,732, issued on December 4, 1906. In devices of this character heretofore constructed the friction thrust collars have been keyed or otherwise attached to the driven or to the drive element but such connection has resulted in the adherence of said collars to the drive or driven element to an objectionable extent during either the expansion or the contraction of the expansible friction ring, thus rendering the structure unreliable for use in automobile structures.

One of the objects of the present invention is to provide a clutch wherein only a thin auxiliary disk is connected to the driving element, the remainder of the clutch mechanism being free to revolve therein.

With these and other objects in view the invention consists in certain novel details of construction and combinations of parts hereinafter more fully described and pointed out in the claims.

In the accompanying drawings the preferred form of the invention has been shown.

In said drawings:—Figure 1 is a central section through a clutch embodying the present improvements. Fig. 2 is a section on line A—B, Fig. 1. Fig. 3 is a perspective view of the expansible ring and the thrust collars.

Referring to the figures by characters of reference 1 designates a cylindrical casing open at one end, the said end being normally closed by a screw cap 2 which may be locked against rotation in any preferred manner as by means of keys 3 in the form of screws inserted through the flange portion of the cap and into openings 4 formed within the casing. The shaft 5 which constitutes the driven element, is extended through an opening 6 formed in the center of the cap and the end of the shaft also projects into a central opening within the end of the casing 1, said opening being indicated at 7. This shaft has a key seat 8 in which is arranged a feather 9. A slide collar 10 is mounted on the shaft and is provided with a tapered wedging gland 11 designed to move into the cap 2 and the casing 1, the said collar and gland being held against rotation by the key or feather 9.

The feather 9 engages a thin metal disk 12 of steel or the like and which has one or more notches 13 in its periphery for the reception of locking screws 14 which are removably mounted within the casing 1. Friction disks or washers 15 and 16 respectively extend around the shaft 5 and bear against opposed faces of the disk 12. Another friction washer 17 is arranged upon the inner end of the casing and about the shaft while an additional friction washer 18 is arranged upon the inner face of the cap 2. A friction disk, preferably of cast iron, is interposed between the washers 15 and 17, as indicated at 19, the said disk being engaged by the key or feather 9 so as to rotate at all times with the shaft 5.

Opposed thrust collars 20 and 21 are mounted for rotation within the casing 1 and between the washers 16 and 18, the said collars being also loose on the shaft 5. The two collars are of a duplicate construction and are provided in their opposing sides with dished contact faces 22 which register and frictionally engage with the respective faces of the expansible friction ring 23. This ring is made up of a plurality of sections *a*, as shown particularly in Figs. 2 and 3, the outer or peripheral edges of the sections being grooved for the reception of a split ring 24 formed of spring metal. This ring serves to bind the sections *a* together. One of the sections *a* has a notch 25 through which the feather 9 extends. The opening formed through the center of the expansible disk is tapered so as to receive the tapered gland 11 heretofore referred to. This opening has been indicated at 26.

It will be apparent that when the gland 11 is partly withdrawn from the casing 1 the spring ring 24 will contract the disk 23 so as to relieve the collars 20 and 21 from the expanding action thereof and thus free the disk 19 of pressure between the washers 15 and 17. Obviously, therefore, the driving element or casing 1 will be free to rotate without producing a corresponding movement of the shaft 5, the only part of the clutch rotating with said casing 1 being the disk 12 which is keyed to the casing. When the collar 10 is shifted longitudinally of the shaft so as to force the gland 11 into the casing 1, the tapered portion of the gland will expand the disk 23 and cause it to exert a wedging action between the thrust collars 20 and 21. Collar 20 will be pressed against the washer 18 and the disk 23 will thus be shifted laterally by the dished surface of the collar 20 and will force the collar 21 slightly against the washer 16. This washer will in turn be forced against disk 12 and that in turn against washer 15. The disk 19 will thus be clamped between the washers 15 and 17 and all of the parts being therefore firmly held together by friction, it will be apparent that motion will be transmitted from the driving element or casing 1 through the disk 12 to disk 19 which is keyed upon the shaft 5 and will thus rotate it.

In view of the small surface engaging the casing 1 it will be apparent, that as soon as the gland 11 is retracted and the disk 23 contracted, the frictional contact between the parts will diminish to such an extent as to promptly release the shaft from the driving action of the casing 1.

Attention is directed to the fact that in the present structure the disk 12 may be considered as the driving element while the disk 19 may be considered as the driven element, the first mentioned disk, 12, of course receiving motion from the casing 1 while the second disk, 19, is the only one of the driven parts which is keyed to and therefore rotates with the shaft 5.

It will be seen that the clutch herein described is very simple, durable and compact in construction and it has been found particularly adapted for use in automobile structures.

Various changes can of course be made in the construction and arrangement of the parts without departing from the spirit or sacrificing any of the advantages of the invention as defined in the appended claims.

What is claimed is:—

1. The combination with a casing constituting a driving element, of a relatively thin disk having a notched periphery, said disk being located within the casing, radially extending means within the casing and projecting into the notches to hold said disk and casing against independent rotation, a shaft mounted for rotation within the disk and casing, a driven disk keyed upon the shaft, thrust collars mounted to rotate within the casing and upon the shaft, an expanding disk interposed between the collars, and means for expanding said disk to shift the collars and disk longitudinally of the shaft.

2. The combination with a casing and a disk keyed therein and revoluble therewith, of a shaft mounted for rotation within the casing, a driven disk keyed upon the shaft and revolubly mounted within the casing, friction washers bearing upon opposed faces of the two disks, means loosely mounted within the casing for shifting the disks and washers to bind them frictionally together, and an element movable upon the shaft for actuating said means.

3. The combination with a casing constituting a driving element, and a disk keyed within and revoluble with the casing, of a shaft mounted for rotation within the disk and casing, a driven disk keyed upon the shaft and loosely mounted within the casing, friction washers contacting with opposed faces of the two disks, thrust collars loosely mounted upon the shaft and within the casing, an expanding disk interposed between said collars, and means upon the shaft for expanding the disk to shift the collars, said collars being adapted to move the disks and washers into frictional contact.

4. The combination with a casing constituting a driving element, of a disk having a notched periphery, said disk being mounted within the casing, means within said casing and projecting into the notches for holding the disk and casing against independent rotation, a shaft mounted for rotation within the disk and casing, a driven disk keyed upon the shaft, friction washers contacting with the faces of the disks, thrust collars loosely mounted within the casing and upon the shaft, an expanding disk interposed between said collars, and a wedging gland feathered upon the shaft and movable into the expanding disk.

5. The combination with a driving casing and a disk keyed thereto and revoluble therewith, of a shaft extending into the casing and loosely mounted within the disk, a driven disk keyed upon the shaft, thrust collars mounted to rotate within the casing and upon the shaft, said collars being slidable on said shaft and in the casing, an expanding disk keyed upon the shaft and interposed between the collars, and means for expanding said disk to shift the collars and friction disk longitudinally of the shaft.

In testimony that I claim the foregoing as my own, I have hereto affixed my signature in the presence of two witnesses.

HARVEY J. WELLS.

Witnesses:
 EDITH L. LUKEY,
 EARL C. RICE.